United States Patent
Gargano

(10) Patent No.: US 11,633,051 B2
(45) Date of Patent: Apr. 25, 2023

(54) BRACKET FOR HANGING RECEPTACLE

(71) Applicant: Snap-on Incorporated, Kenosha, WI (US)

(72) Inventor: Angelo J. Gargano, Hainesville, IL (US)

(73) Assignee: Snap-on Incorporated, Kenosha, WI (US)

( * ) Notice: Subject to any disclaimer, the term of this patent is extended or adjusted under 35 U.S.C. 154(b) by 101 days.

(21) Appl. No.: 16/660,326

(22) Filed: Oct. 22, 2019

(65) Prior Publication Data
US 2021/0112998 A1 Apr. 22, 2021

(51) Int. Cl.
A47F 5/00 (2006.01)
A47F 5/08 (2006.01)
F16M 13/02 (2006.01)

(52) U.S. Cl.
CPC .......... *A47F 5/0823* (2013.01); *A47F 5/0025* (2013.01); *A47F 5/0853* (2013.01); *F16M 13/022* (2013.01)

(58) Field of Classification Search
CPC .... A47F 5/0815; A47F 5/0823; A47F 5/0838; A47F 5/0846; A47F 5/0853; A47F 5/0025; F16M 13/022
USPC ............ 248/220.31, 220.41, 220.42, 220.43; 211/59.1, 94.01
See application file for complete search history.

(56) References Cited

U.S. PATENT DOCUMENTS

| | | | |
|---|---|---|---|
| 2,400,807 A * | 5/1946 | Burkhard | A47F 5/0876 248/222.12 |
| 2,428,073 A | 9/1947 | Handel | |
| 2,678,793 A * | 5/1954 | Brochstein | A47B 57/404 248/243 |
| 2,683,891 A | 7/1954 | Rosenbaum | |
| 2,797,817 A * | 7/1957 | Shugarman | A47G 25/0678 211/96 |
| 2,913,210 A | 11/1959 | Tichnor | |
| 3,014,597 A * | 12/1961 | Mcwherter | A47F 5/0815 211/175 |
| 3,031,088 A | 4/1962 | Ribbens et al. | |
| 3,602,159 A * | 8/1971 | Marschak | A47F 5/103 108/187 |
| 3,669,034 A | 6/1972 | Marschak | |
| 3,712,698 A | 1/1973 | Propst et al. | |

(Continued)

FOREIGN PATENT DOCUMENTS

| | | |
|---|---|---|
| CA | 2173568 A1 | 10/1996 |
| CA | 2694846 A1 | 11/2010 |

(Continued)

OTHER PUBLICATIONS

Taiwan Office Action for Application No. 11020152320 dated Feb. 20, 2021, 7 pages.

(Continued)

*Primary Examiner* — Muhammad Ijaz
*Assistant Examiner* — Guang H Guan
(74) *Attorney, Agent, or Firm* — Seyfarth Shaw LLP

(57) ABSTRACT

A bracket adapted to couple to a slot disposed in a pegboard or slot-type wall and hold receptacles. The receptacles can be different sizes and be disposed at different elevations on the bracket. The bracket can also be coupled to the wall via a hook and a fastener to reduce accidental decoupling of the bracket from the wall.

6 Claims, 3 Drawing Sheets

(56) References Cited

U.S. PATENT DOCUMENTS

| | | | |
|---|---|---|---|
| 4,126,230 A | 11/1978 | Tyson et al. | |
| 4,228,906 A | 10/1980 | Jones | |
| 4,349,113 A | 9/1982 | Schreiner | |
| 4,401,222 A | 8/1983 | Kulikowski et al. | |
| 4,403,700 A | 9/1983 | Manlove | |
| 4,575,164 A * | 3/1986 | Pinnow | A47B 57/404 211/126.15 |
| 4,776,482 A | 10/1988 | Wolters et al. | |
| 4,826,022 A * | 5/1989 | Duarte | A47F 5/0846 248/222.12 |
| 4,828,120 A | 5/1989 | Beil et al. | |
| 5,125,518 A * | 6/1992 | Ward | A47F 5/0846 211/87.01 |
| 5,305,898 A * | 4/1994 | Meri | A47F 5/0807 211/103 |
| 5,379,976 A * | 1/1995 | DeGirolamo | A47F 5/0815 248/220.43 |
| 6,164,467 A | 12/2000 | DePottey et al. | |
| 6,220,461 B1 * | 4/2001 | Dickinson | A47B 57/045 108/108 |
| 6,266,250 B1 * | 7/2001 | Foye | H02B 1/043 248/220.21 |
| 6,378,828 B1 * | 4/2002 | Valiulis | A47F 5/0838 211/59.1 |
| 6,644,483 B1 * | 11/2003 | Lai | A47F 5/0823 248/222.52 |
| 7,428,972 B2 | 9/2008 | Warner et al. | |
| 7,441,736 B2 * | 10/2008 | Wiltfang | A47F 5/0823 211/87.01 |
| 7,644,527 B2 * | 1/2010 | Clark | A47F 5/137 40/610 |
| 7,798,338 B2 * | 9/2010 | Maheu | A47F 5/0815 211/94.02 |
| D640,122 S | 6/2011 | Stearns et al. | |
| 8,042,700 B1 | 10/2011 | Smalley | |
| 8,061,539 B2 | 11/2011 | Punzel et al. | |
| 8,434,629 B2 | 5/2013 | Fernandez | |
| 8,540,088 B2 | 9/2013 | Brasher | |
| 8,919,583 B2 | 12/2014 | Brasher | |
| 8,925,745 B2 | 1/2015 | Theisen et al. | |
| 9,245,464 B2 | 1/2016 | Theisen et al. | |
| 9,384,684 B2 | 7/2016 | Theisen et al. | |
| 9,671,063 B2 * | 6/2017 | Mason | A47F 5/0846 |
| 9,782,018 B2 | 10/2017 | Hester-Redmond | |
| 9,918,567 B2 | 3/2018 | Pena | |
| 9,980,582 B1 | 5/2018 | Levy et al. | |
| 10,018,299 B2 * | 7/2018 | Feldman | F16M 11/22 |
| 10,051,978 B2 | 8/2018 | Gupta et al. | |
| 10,098,479 B1 | 10/2018 | Muellerleile | |
| 10,334,970 B2 * | 7/2019 | Buck | A47F 5/103 |
| 10,405,675 B1 * | 9/2019 | Yu | A47F 5/0823 |
| 10,952,534 B2 * | 3/2021 | Peck | A47B 96/024 |
| 2011/0266283 A1 | 11/2011 | Ernst et al. | |
| 2017/0261154 A1 | 9/2017 | Feldman | |
| 2021/0112998 A1 * | 4/2021 | Gargano | A47F 5/0838 |

FOREIGN PATENT DOCUMENTS

| | | |
|---|---|---|
| CH | 685612 A5 | 4/1992 |
| CN | 103919375 A | 7/2014 |
| CN | 205394485 U | 7/2016 |
| CN | 108652332 A | 10/2018 |
| CN | 208329439 U | 1/2019 |
| TW | 322733 | 12/1997 |

OTHER PUBLICATIONS

Combined Search and Examination Report for Application No. GB2016016.4 dated Mar. 5, 2021, 7 pages.

Deuba, "Deuba Plastic Bins Kit with Wall Panel 32 Pcs Storage Bin Rack for Garage Wall Mounted Organizer Unit Stackable Boxes," Amazon UK, [online], available from: http://gourl/gr/czo5 (URL shortened) [accessed on Mar. 4, 2021] Jun. 13, 2014, 1 page.

Taiwan Office Action for corresponding Application No. 11020948110 dated Sep. 30, 2021, 7 pages.

Canadian Office Action for corresponding Application No. 3,095,399 dated Dec. 2, 2021, 6 pages.

Horusdy, "Horusdy Wall Mounted Storage Bins," Amazon.ca, https://www.amazon.ca/HORUSDY-Mounted-Storage-Organizer-Plastic/dp/B0768DC8G6/ref=pdf_sbs_6/147-8153737-9750118?pdf_rd?W=19Fz7&pf_rd_p=01fdeee8-dd76-431b-910b-f00bfed49bd2&pf_rd_r=PCKPB1M6NER0QSZSZJRE&pd_rd_r=1a11d29d-102d-48da-973b-f8b27441d327&pd_rd_wg=VNo7r&pd_rd_i=B0768DC8G6&psc=1, Nov. 26, 2017, 7 pages.

Chinese Office Action for corresponding CN Application No. 202011141763.X, dated Jan. 17, 2022, 10 pages.

Australian Examination Report No. 1 for corresponding AU Application No. 2020250244, dated Feb. 14, 2022, 4 pages.

* cited by examiner

BRACKET FOR HANGING RECEPTACLE

TECHNICAL FIELD OF THE INVENTION

The present invention relates generally to brackets. More particularly, the present invention relates to brackets for supporting receptacles.

BACKGROUND OF THE INVENTION

Brackets are often used to hold receptacles, such as part bins or tools, to pegboard or slot-type walls. The brackets typically have hooks that releasably couple with apertures or slots in the wall. A receptacle then typically hangs off the bracket. This solution does not secure the bracket to the wall, and/or prevent the receptacle from sliding off the end of the bracket. Accordingly, the bracket can be accidently removed from the slot in the wall, and/or the receptacle can accidently be removed from the bracket, thereby risking injury or causing items being stored in the receptacle to spill. Further, this solution only allows for receptacles to be hung at a single elevation along the bracket. Accordingly, another bracket is needed to allow for multiple receptacles to be held at different elevations on the wall. The added bracket takes up additional space on the wall, which reduces the amount of bins and/or tools that can be held on the wall

SUMMARY OF THE INVENTION

The present invention broadly relates to a bracket that has hooks adapted to couple to a slot disposed in a pegboard or slot-type wall (also referred to as Slot-N-Dot). The bracket can also be coupled to the wall with a fastener passing through apertures in both the bracket and the wall, thereby providing stability, compared to conventional brackets. Further, the bracket can be adapted to hold receptacles or bins at different elevations along the bracket.

In an embodiment, the present invention broadly comprises a bracket adapted to receive first and second receptacles and be releasably coupled to a wall having slots or apertures. The bracket includes a first body portion adapted to receive the first receptacle, a second body portion disposed at a distance from the first body portion and adapted to abut the wall when the bracket is coupled to the wall, and a third body portion disposed at a distance from the second body portion and adapted to receive the second receptacle.

In another embodiment, the present invention comprises a bracket adapted to receive first and second receptacles or receptacles, and is releasably coupled to a peg board that includes slots and apertures. The bracket includes a first body portion adapted to receive a hook of the first receptacle and includes protrusions disposed proximate opposing first and second ends of the bracket. A second body portion is disposed at a distance from the first body portion, and adapted to abut the board when the bracket is coupled to the peg board, and includes hooks and an aperture adapted to couple to the slots and the apertures in the peg board. A third body portion is disposed in a same plane as the first body portion and includes a slot adapted to couple to a hook of the second receptacle and a flange with an end disposed in a same plane as the second body portion and is adapted to abut the peg board when the bracket is coupled to the board.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
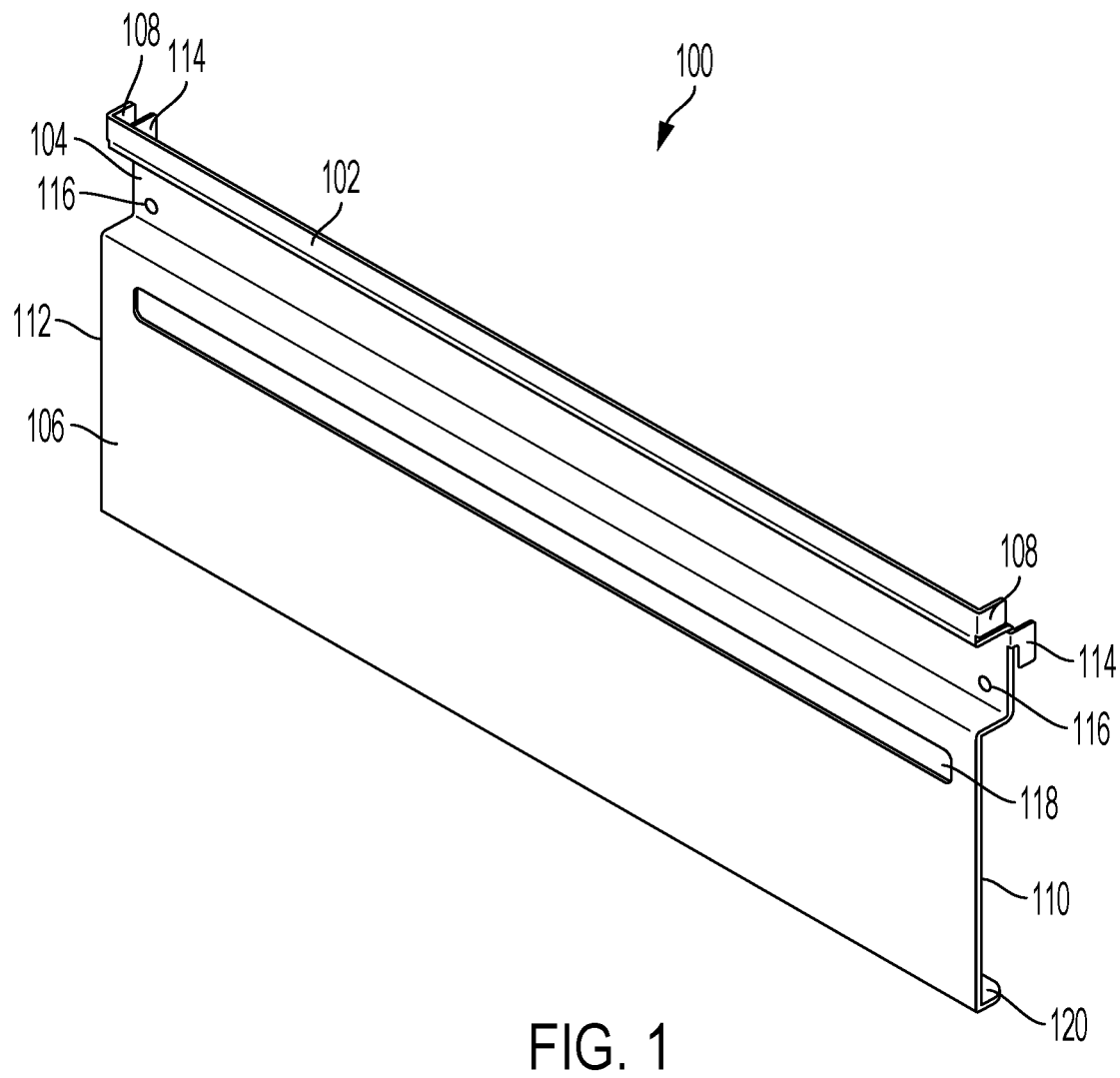
FIG. 1 is a perspective view of an embodiment of a bracket of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a bracket adapted to be releasably coupled to a slot disposed in a wall and a receptacle or bin. The bracket is also adapted to receive a fastener and be coupled to the wall by the fastener passing through apertures in the wall and the bracket. In an embodiment, the bracket is adapted to retain receptacles or bins at different elevations along the bracket.

Figure 2:
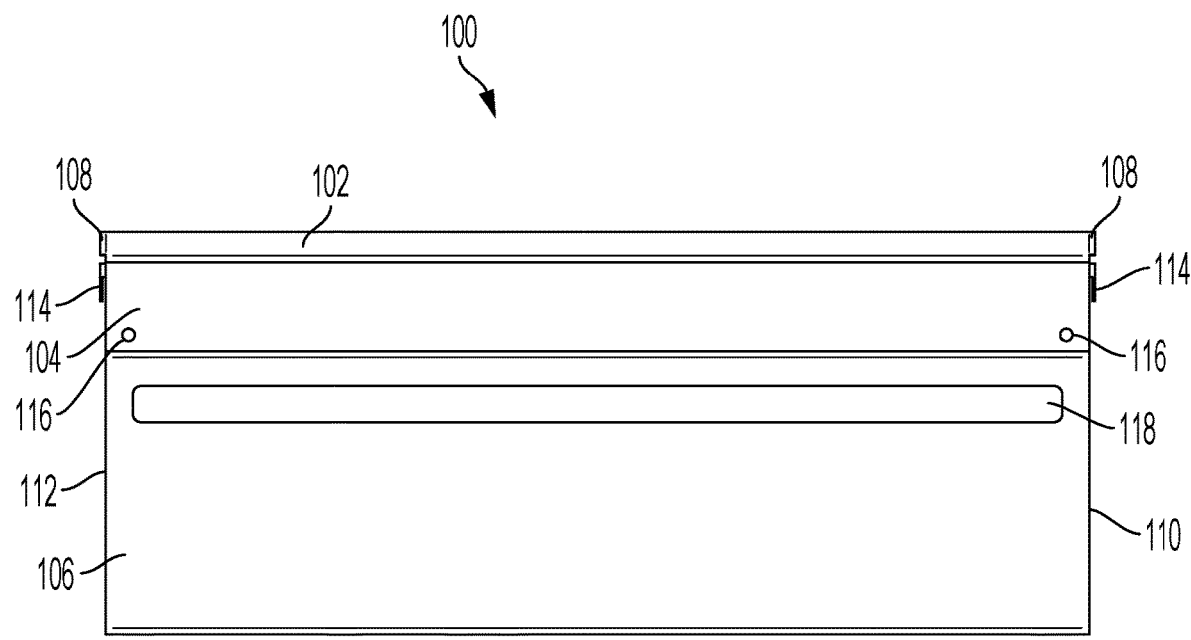
FIG. 2 is a front plan view of a front of the bracket of FIG. 1.
Figure 3:
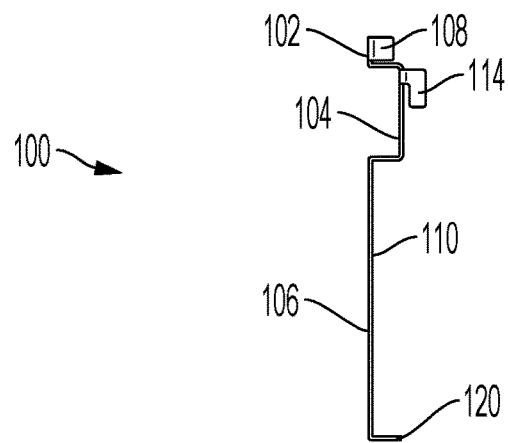
FIG. 3 is a side plan view of an end of the bracket of FIG. 1.
Figure 4:
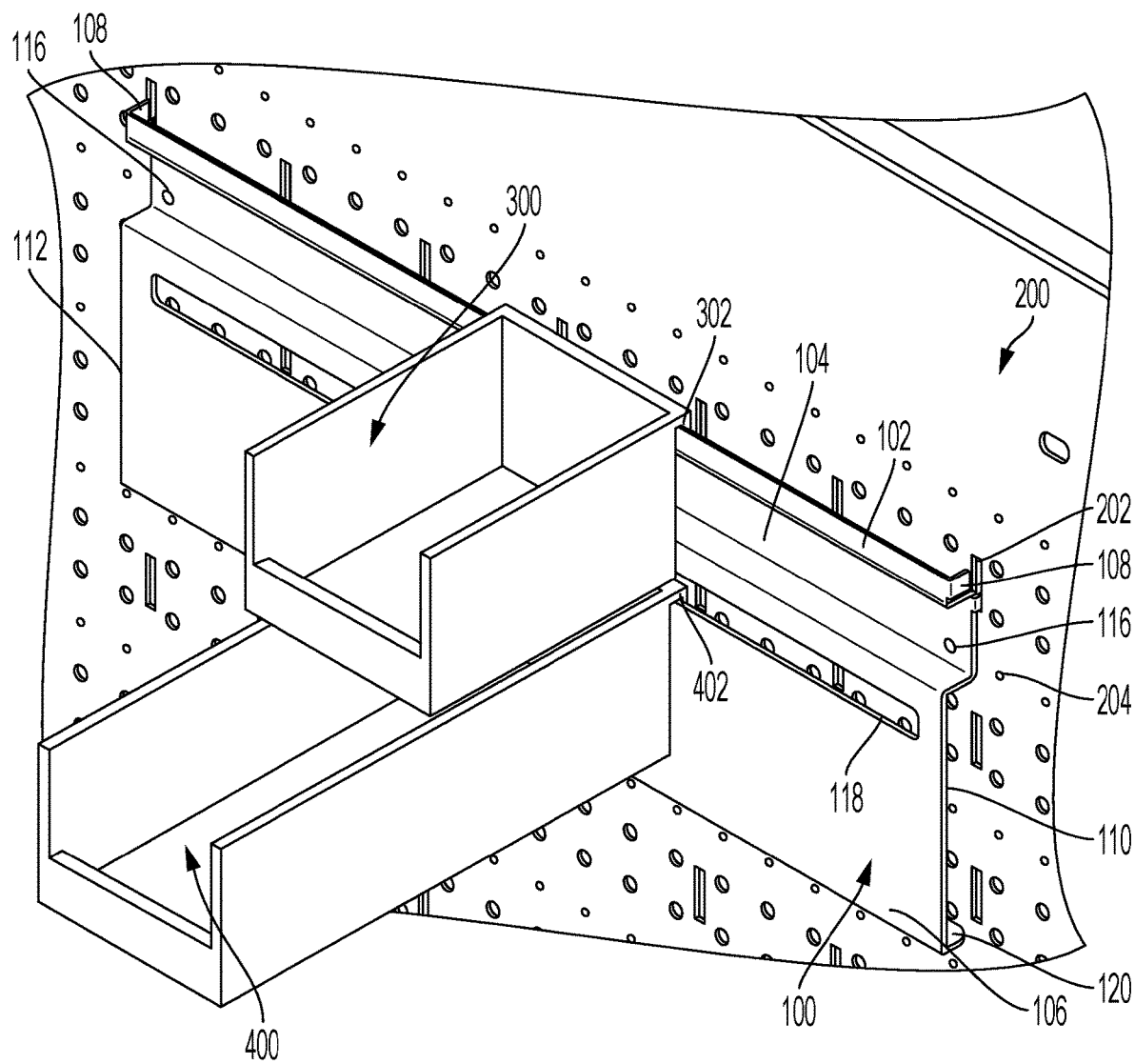
FIG. 4 is a perspective view of the bracket of FIG. 1 coupled to a wall with receptacles or bins.

Referring to FIGS. 1 through 4, an embodiment of a bracket 100 of the present invention is shown. The bracket 100 of the present invention is adapted to releasably couple to a wall 200 and receive and hold first 300 and second 400 receptacles. As illustrated, the bracket 100 includes a first body portion 102, a second body portion 104, and a third body portion 106. The first 102, second 104, and/or third 106 body portions may be formed from a single piece of material, such as sheet metal, or otherwise joined together by known methods, such as welding.

The first body portion 102 is adapted to releasably couple with a first receptacle 300. As illustrated, the first receptacle 300 can hang via a hook 302 from the first body portion 102, and be movable or slideable along the first body portion 102. The first body portion 102 includes one or more protrusions 108 extending in a rearwardly direction towards the wall 200. The protrusions 108 can be disposed proximate to opposing first 110 and second 112 ends of the bracket 100, and reduce the risk of the first receptacle 300 sliding off the bracket 100.

The second body portion 104 is disposed at a distance (for example, offset) from the first body portion 102 and is adapted to abut the wall 200 when the bracket 100 is coupled to the wall 200. In other words, the second body portion 104 is in a different plane than the first body portion 102 and is adjacent to the wall 200 when the bracket 100 is releasably coupled to the wall 200.

The second body portion 104 includes one or more hooks 114 that extend in a rearwardly direction towards the wall 200. The hooks 114 can be disposed proximate to the opposing first 110 and second 112 ends of the bracket 100, and are adapted to releasably couple to slots 202 in the wall 200. As illustrated, a portion of the hooks 114 can be spaced away from the second body portion 104 (for example, forming a notch) to allow the wall 200 to be disposed between the hooks 114 and the second body portion 104 (for example, the wall 200 may be received in the notch).

The second body portion 104 includes one or more apertures 116. As illustrated, the second body portion 104 includes two apertures 116, each proximate to the opposing first 110 and second 112 ends of the bracket 100. Each aperture 116 corresponds to an aperture 204 in the wall 200 when the bracket 100 is releasably coupled to the wall 200. Each aperture 116 of the second body portion 104 and the corresponding aperture 204 in the wall 200 are adapted to receive a fastener (not shown). The fastener can be a helically threaded screw or bolt and nut, peg, etc. Each aperture 116 of the second body portion 104 and/or the aperture 204 in the wall 200 is adapted to receive the fastener and couple the bracket 100 to the wall 200. Alternately, the fastener can engage a nut (not shown), such that the second body portion 104 and the wall are disposed between a head of the fastener and the nut.

The third body portion 106 is disposed at a distance (for example, offset) from the second body portion 104. The third body portion 106 can be in a same plane as the first body portion 102. The third body portion 106 can also provide support to the first receptacle 300 when the first receptacle 300 is coupled to the first body portion 102. For example, the third body portion 106 may abut a rear side of the first receptacle 300 when the first receptacle 300 is coupled to the first body portion 102. The third body portion 106 is also adapted to couple to and support the second receptacle 400. For example, the third body portion 106 includes a slot 118 and a return flange 120.

The slot 118 is adapted to couple with a hook 402 of the second receptacle 400, such that the second receptacle 400 can hang via the hook 402 from the third body portion 106. The slot 118 can extend from proximate the first end 110 of the bracket 100 along the third body portion 106 to proximate the second 112 end of the bracket 100. This allows the second receptacle 400 to be movable or slideable along the slot 118.

The return flange 120 can be disposed at an end opposite the first body portion 102. The return flange 120 can extend in a rearward direction from the third body portion 106. As illustrated, the return flange 120 can have an end in the same plane as the second body portion 104. Therefore, the return flange 120 can abut the wall 200 when the bracket 100 is coupled to the wall 200, thereby providing additional support to the bracket 100.

In an embodiment, the first 300 and second 400 receptacles can be part bins. As illustrated, the first receptacle 300 can be coupled at a different elevation than the second receptacle 400. Further, the first 300 and second 400 receptacles can have different dimensions, such as length, width, and/or height, or can be identical. As illustrated, the second receptacle 400 can be longer that the first receptacle 300. It will be appreciated that the brackets of the present invention are not limited to just hanging receptacles or bins, but can hang other items as well, such as tools or other items.

The wall 200 can be a pegboard or slot-type wall and have any number of slots 202 and apertures 204. In an embodiment, the wall 200 can be disposed on a tool chest, a work bench, a building wall, etc.

Accordingly, the bracket is adapted to releasably couple to a slot disposed in a pegboard or slot-type wall, and provide strength and stability, compared to conventional brackets. Further, the bracket can be adapted to hold receptacles of varying sizes and at different elevations along the bracket.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A bracket having a first end and a second end opposing the first end, the bracket adapted to receive a first receptacle and a second receptacle, and the bracket adapted to be releasably coupled to a wall having wall apertures, wherein the first receptacle and the second receptacle respectively include a first receptacle hook and a second receptacle hook, the bracket comprising:
a first body portion adapted to receive the first receptacle;
protrusions extending substantially perpendicular from the first body portion and respectively disposed proximate the first and second ends;
a second body portion disposed substantially parallel to and at a distance from the first body portion, wherein the second body portion is adapted to abut the wall when the bracket is coupled to the wall, and wherein the second body portion includes apertures adapted to respectively receive fasteners to couple the bracket to the wall;
a third body portion disposed in a same plane as the first body portion, wherein the third body portion includes a slot adapted to receive the second receptacle hook, and wherein the slot extends from proximate the first end to proximate the second end; and
bracket hooks extending substantially perpendicular from the second body portion and adapted to be respectively received by the wall apertures, wherein the bracket hooks are disposed between the first and third body portions.

2. The bracket of claim 1, wherein the first body portion is adapted to receive the first receptacle hook.

3. The bracket of claim 1, wherein the apertures of the second body portion are respectively disposed proximate the first and second ends.

4. The bracket of claim 1, further comprising a flange extending substantially perpendicular from the third body portion and including an end adapted to abut the wall when the bracket is coupled to the wall.

5. The bracket of claim 4, wherein the end of the flange is disposed in a same plane as the second body portion.

6. A bracket having a first end and a second end opposing the first end, the brackets adapted to receive a first receptacle and a second receptacle, and the bracket adapted to be coupled to a peg board that includes peg board apertures, wherein the first receptacle and the second receptacle respectively include a first receptacle hook and a second receptacle hook, the bracket comprising:

a first body portion adapted to receive the first receptacle hook;

protrusions extending substantially perpendicular from the first body portion and respectively disposed proximate the first and second ends;

a second body portion disposed substantially parallel to and at a distance from the first body portion, wherein the second body portion is adapted to abut the peg board when the bracket is coupled to the peg board, and wherein the second body portion includes apertures adapted to respectively receive fasteners to couple the bracket to the peg board;

a third body portion disposed in a same plane as the first body portion and including a slot adapted to receive the second receptacle hook, wherein the slot extends from proximate the first end to proximate the second end;

a flange extending substantially perpendicular from the third body portion and including an end disposed in a same plane as the second body portion, wherein the end of the flange is adapted to abut the peg board when the bracket is coupled to the peg board; and bracket hooks extending substantially perpendicular from the second body portion and adapted to be respectively received by the peg board apertures, wherein the bracket hooks are disposed between the first and third body portions.

* * * * *